(12) United States Patent
Wang et al.

(10) Patent No.: US 11,286,774 B2
(45) Date of Patent: Mar. 29, 2022

(54) INTERFERENCE PROTECTION DEVICE AND METHOD FOR HYDRAULIC SUPPORT AND CUTTING PART OF SHEARER

(71) Applicants: China University of Mining and Technology, Jiangsu (CN); XUZHOU GOLDFLUID HYDRAULIC TECHNOLOGY DEVELOPMENT CO., LTD., Jiangsu (CN)

(72) Inventors: Zhongbin Wang, Jiangsu (CN); Honglin Wu, Jiangsu (CN); Chao Tan, Jiangsu (CN); Xuliang Lu, Tiangsu (CN); Bowen Liu, Jiangsu (CN); Xiaoyu Li, Jiangsu (CN); Yue Wu, Jiangsu (CN); Hongya Zhou, Jiangsu (CN)

(73) Assignees: China University of Mining and Technology, Jiangsu (CN); XUZHOU GOLDFLUID HYDRAULIC TECHNOLOGY DEVELOPMENT CO., LTD., Jiangsu (CN)

( * ) Notice: Subject to any disclaimer, the term of this patent is extended or adjusted under 35 U.S.C. 154(b) by 54 days.

(21) Appl. No.: 16/762,946

(22) PCT Filed: Jun. 18, 2019

(86) PCT No.: PCT/CN2019/091620
§ 371 (c)(1),
(2) Date: May 11, 2020

(87) PCT Pub. No.: WO2020/181672
PCT Pub. Date: Sep. 17, 2020

(65) Prior Publication Data
US 2021/0262345 A1    Aug. 26, 2021

(30) Foreign Application Priority Data

Mar. 14, 2019 (CN) .......................... 201910192195.7

(51) Int. Cl.
*E21D 23/12* (2006.01)
*B23D 33/00* (2006.01)
*E21F 17/18* (2006.01)

(52) U.S. Cl.
CPC ............. *E21D 23/12* (2013.01); *B23D 33/00* (2013.01); *E21F 17/18* (2013.01)

(58) Field of Classification Search
CPC ......... E21C 35/24; E21C 35/08; E21D 23/12; E21D 23/00; E21F 17/18
See application file for complete search history.

(56) References Cited

U.S. PATENT DOCUMENTS

| 5,181,934 A * | 1/1993 | Stolarczyk | .............. E21C 35/24 |
| | | | 299/1.2 |
| 2010/0276981 A1* | 11/2010 | Kussel | .................... E21D 23/12 |
| | | | 299/1.3 |

(Continued)

FOREIGN PATENT DOCUMENTS

| CN | 103711486 | 4/2014 |
| CN | 104990549 | 10/2015 |

(Continued)

OTHER PUBLICATIONS

"International Search Report (Form PCT/ISA/210) of PCT/CN2019/091620," dated Dec. 9, 2019, pp. 1-5.

*Primary Examiner* — Carib A Oquendo
(74) *Attorney, Agent, or Firm* — JCIPRNET

(57) ABSTRACT

Disclosed is an interference protection device and method for a hydraulic support and a cutting part of a shearer. The device includes: a plurality of dust-proof cases evenly and fixedly provided on a surface of one side of a hauling part of the shearer that faces away from a coal wall, and a dust-proof housing fixed on the hydraulic support. A first ultrasonic transducer and a flash lamp are fixedly provided in each dust-proof case, and a second ultrasonic transducer, a receiver, and a data processing module are fixedly provided in the dust-proof housing. The data processing module is electrically connected to the second ultrasonic transducer and the receiver separately, the first ultrasonic transducers and the flash lamps are all electrically connected to an (Continued)

external single-chip microcomputer, and the data processing module is electrically connected to a hydraulic support control computer. The present invention obtains a distance from the shearer to the hydraulic support by calculation from a difference between time points at which the second ultrasonic transducer and the receiver on the hydraulic support respectively receive an ultrasonic signal and an optical signal, and thus timely controls a guard plate to retract, thereby achieving the advantages of low cost, high applicability and high reliability.

1 Claim, 2 Drawing Sheets

(56) References Cited

U.S. PATENT DOCUMENTS

| | | | | |
|---|---|---|---|---|
| 2012/0104829 A1* | 5/2012 | Weigel | ................. | F15B 19/005 |
| | | | | 299/1.7 |
| 2012/0161493 A1* | 6/2012 | Junker | ................... | E21C 35/08 |
| | | | | 299/1.1 |
| 2013/0283917 A1 | 10/2013 | Coonrod et al. | | |
| 2017/0019641 A1* | 1/2017 | Rahms | ................... | E21D 23/12 |
| 2017/0159431 A1* | 6/2017 | Rimmington | ........... | E21C 27/02 |

FOREIGN PATENT DOCUMENTS

| | | | | |
|---|---|---|---|---|
| CN | 106869929 | | 6/2017 | |
| JP | 2002023848 | | 1/2002 | |
| WO | WO-2011101812 A2 * | | 8/2011 | ............. E21C 35/08 |
| WO | WO-2017008393 A1 * | | 1/2017 | ............. E21F 17/00 |

\* cited by examiner

INTERFERENCE PROTECTION DEVICE AND METHOD FOR HYDRAULIC SUPPORT AND CUTTING PART OF SHEARER

CROSS-REFERENCE TO RELATED APPLICATION

This application is a 371 of international application of PCT application serial no. PCT/CN2019/091620, filed on Jun. 18, 2019, which claims the priority benefit of China application no. 201910192195.7, filed on Mar. 14, 2019. The entirety of each of the above mentioned patent applications is hereby incorporated by reference herein and made a part of this specification.

BACKGROUND

Technical Field

The present invention relates to the field of interference protection for a hydraulic support and a cutting part of a shearer, and in particular, to an interference protection device and method for a hydraulic support and a cutting part of a shearer.

Description of Related Art

With the advancement and development of a mechanical mining process, some experts have proposed a concept of "unmanned production" or "few-people production" in a working face. Such a concept raises a high requirement on coordination between three machines: a shearer, a hydraulic support, and a scraper conveyor. The shearer, as the major equipment among the three coordinated machines during fully-mechanized coal mining, is mainly used for coal mining and falling. The hydraulic support is used to cooperate with the shearer to support and protect the working face. The degree of coordination between the shearer, the hydraulic support, and the scraper conveyor determines the efficiency of the fully-mechanized coal mining and the safety of an entire fully-mechanized mining face.

At present, intellectualization of the fully-mechanized mining face is still in the development stage, and some mines have a much low automation level. Interference between a cutting part of the shearer and a guard plate of the hydraulic support is still one of problems to be solved to realize intellectualization of the fully-mechanized coal mining. The interference between the cutting part of the shearer and the guard plate of the hydraulic support during a cutting operation lies in that: when the cutting part of a shearer roller moves to a particular position near the hydraulic support, cutting teeth of the shearer roller collide with the guard plate of the hydraulic support if the guard plate is not retracted in time, bringing damage to the cutting roller of the shearer and harm to the guard plate of the hydraulic support, and even causing paralysis of the entire fully-mechanized mining face under a serious condition.

SUMMARY

In view of the foregoing shortcomings in the prior art, an objective of the present invention is to provide an interference protection device and method for a hydraulic support and a cutting part of a shearer. The method obtains a distance from the shearer to the hydraulic support by calculation from a difference between time points at which a second ultrasonic transducer and a receiver on the hydraulic support respectively receive an ultrasonic signal and an optical signal, and thus timely controls a guard plate of the hydraulic support to retract so as to prevent interference between the hydraulic support and the cutting part of the shearer, thereby achieving low cost, high applicability and high reliability.

To solve the foregoing technical problems, the present invention adopts the following technical solutions:

The present invention provides an interference protection device for a hydraulic support and a cutting part of a shearer, which includes: a plurality of dust-proof cases evenly and fixedly provided on a surface of one side of a hauling part of the shearer that faces away from a coal wall, and a dust-proof housing fixed on the hydraulic support, where a first ultrasonic transducer and a flash lamp are fixedly provided in each dust-proof case, and a second ultrasonic transducer, a receiver, and a data processing module are fixedly provided in the dust-proof housing; the data processing module is electrically connected to the second ultrasonic transducer and the receiver separately, the first ultrasonic transducers and the flash lamps are all electrically connected to an external single-chip microcomputer, and the data processing module is electrically connected to a hydraulic support control computer.

Preferably, there are five dust-proof cases.

Preferably, the dust-proof case and the dust-proof housing are both made from a transparent PC endurance board.

Preferably, the dust-proof housing is fixed in the middle near the front on a lower side of a top beam of the hydraulic support.

(1) setting a threshold d of a minimum distance from a second ultrasonic transducer on the hydraulic support to first ultrasonic transducers on the shearer when the shearer gets close to the hydraulic support to a threshold 1, and setting a threshold d of a minimum distance from the second ultrasonic transducer on the hydraulic support to the first ultrasonic transducers on the shearer when the shearer moves away from the hydraulic support to a threshold 2; and also setting a time threshold as $t_{threshold}$;

(2) using an external single-chip microcomputer to control the first ultrasonic transducers and flash lamps on the shearer to simultaneously run and turn off, where the first ultrasonic transducers and the flash lamps are turned on at a regular interval of T=1 s;

(3) letting i be 0 (i is recorded in order to compare numerical values of di and di−1 later);

(4) performing step (5) if a receiver on the hydraulic support receives an optical signal sent by the flash lamps; otherwise, performing step (6);

(5) performing steps (7) to (11) if the second ultrasonic transducer on the hydraulic support receives an ultrasonic signal sent by the first ultrasonic transducers on the shearer; otherwise, performing step (4);

(6) recording duration for which the receiver on the hydraulic support fails to receive optical signal sent by the flash lamps as $t_{failure}$; and if $t_{failure}$ is greater than $t_{threshold}$, performing step (3); otherwise performing step (4);

(7) letting i be i+1;

(8) recording a time point ti at which the receiver receives the optical signal, and a time point t'i at which the second ultrasonic transducer on the hydraulic support receives the ultrasonic signal;

(9) calculating a difference between the time points at which the second ultrasonic transducer and the receiver on the hydraulic support respectively receive the ultrasonic signal and the optical signal: $\Delta t_i = t'_i - t_i$;

(10) calculating a distance from the second ultrasonic transducer on the hydraulic support to the first ultrasonic transducer on the shearer: $di=v·\Delta ti$, where v is the velocity of sound herein because the velocity of light is much greater than the velocity of sound;

(11) if $i>2$, performing step (12); otherwise, performing step (13);

(12) if $di \leq di-1$, performing step (13); otherwise, performing step (15);

(13) recording a current status as a status of the shearer being close to the hydraulic support, and comparing the calculated distance di from the second ultrasonic transducer on the hydraulic support to the first ultrasonic transducer on the shearer with the set threshold 1 of d; and if di is less than the set threshold 1 of d, performing step (14); otherwise, performing step (4);

(14) sending out, by a hydraulic support control computer, a signal to control a guard plate to retract, and performing step (4);

(15) recording a current status as a status of the shearer being away from the hydraulic support, and comparing the calculated distance di from the second ultrasonic transducer on the hydraulic support to the first ultrasonic transducer on the shearer with the set threshold 2 of d; and if di is greater than the set threshold 2 of d, performing step (16); otherwise, performing step (4); and

(16) sending out, by the hydraulic support control computer, a signal to control the guard plate to extend, and performing step (4).

The present invention has the following advantageous effects: The device of the present invention obtain a distance from the shearer to the hydraulic support by calculation from a difference between time points at which the ultrasonic transducer and the receiver on the hydraulic support respectively receive the ultrasonic signal and the optical signal, and thus timely controls a guard plate of the hydraulic support to retract so as to prevent interference between the hydraulic support and a cutting part of the shearer. The device further uses dust-proof cases and a dust-proof housing to protect components and parts against dust, preventing coal ash and dust from entering the inside and thus prolonging service life of the components and parts. The device of the present invention has low cost, high applicability, high reliability, and a long service life, and is safe and accurate during use.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and those of ordinary skill in the art may still derive other drawings from these accompanying drawings without creative efforts.

DESCRIPTION OF THE EMBODIMENTS

The technical solutions of the embodiments of the present invention are clearly and completely described below with reference to the accompanying drawings in the embodiments of the present invention. Apparently, the described embodiments are some rather than all of the embodiments of the present invention. Based on the described embodiments of the present invention, other embodiments obtained by those of ordinary skill in the art without creative effort all belong to the scope of protection of the present invention.

Figure 1:
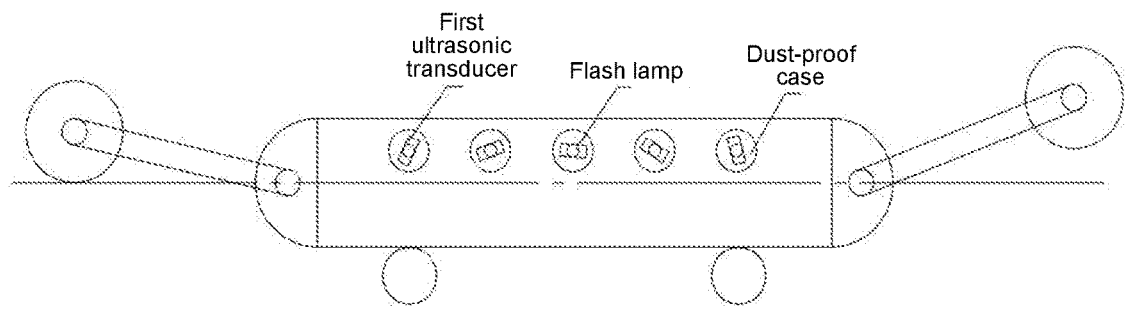
FIG. 1 is a schematic diagram showing arrangement of dust-proof cases fitted with a first ultrasonic transducer and a flash lamp on a hauling part of a shearer in the present invention.
Figure 2:
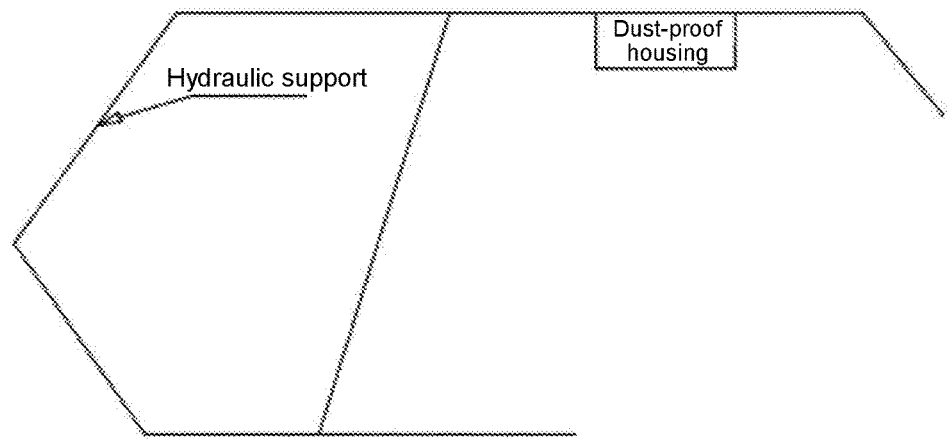
FIG. 2 is a schematic diagram showing arrangement of a dust-proof housing fitted with a second ultrasonic transducer, a receiver, and a data processing module on a hydraulic support in the present invention.
Figure 3:
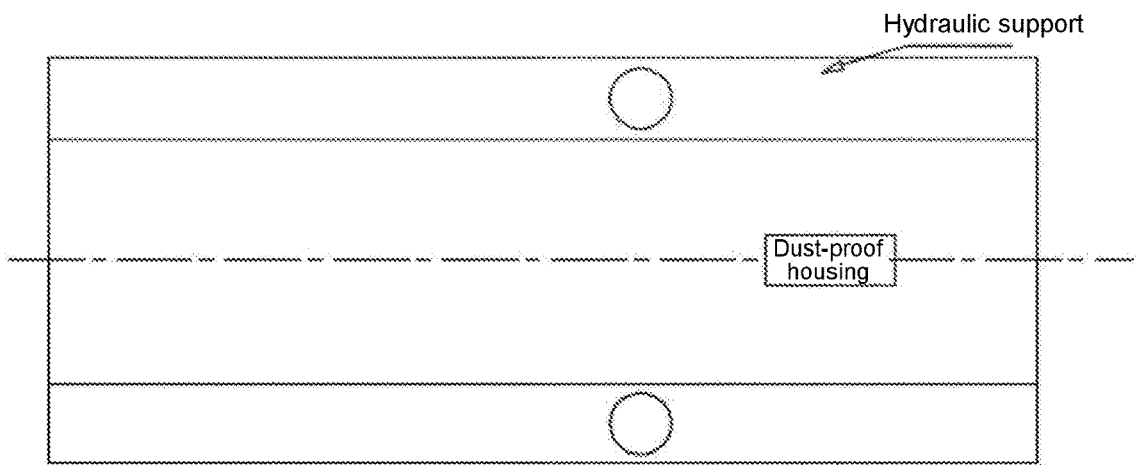
FIG. 3 is a bottom view of the arrangement of the dust-proof housing on the hydraulic support in FIG. 2.

As shown from FIG. 1 to FIG. 3, an interference protection device for a hydraulic support and a cutting part of a shearer includes: a plurality of dust-proof cases evenly and fixedly provided on a surface of one side of a hauling part of the shearer that faces away from a coal wall; and a dust-proof housing fixed on the hydraulic support. A first ultrasonic transducer and a flash lamp are fixedly provided in each dust-proof case, and these first ultrasonic transducers are mounted in different directions, to guarantee comprehensive coverage of an ultrasonic signal. A second ultrasonic transducer, a receiver, and a data processing module are fixedly provided in the dust-proof housing. The data processing module is electrically connected to the second ultrasonic transducer and the receiver separately, the first ultrasonic transducers and the flash lamps are all electrically connected to an external single-chip microcomputer, and the data processing module is electrically connected to a hydraulic support control computer.

There are five dust-proof cases.

The dust-proof case and the dust-proof housing are both made from a transparent PC endurance board, which has excellent light transmittance.

The dust-proof housing is fixed in the middle near the front on a lower side of a top beam of the hydraulic support.

Figure 4:
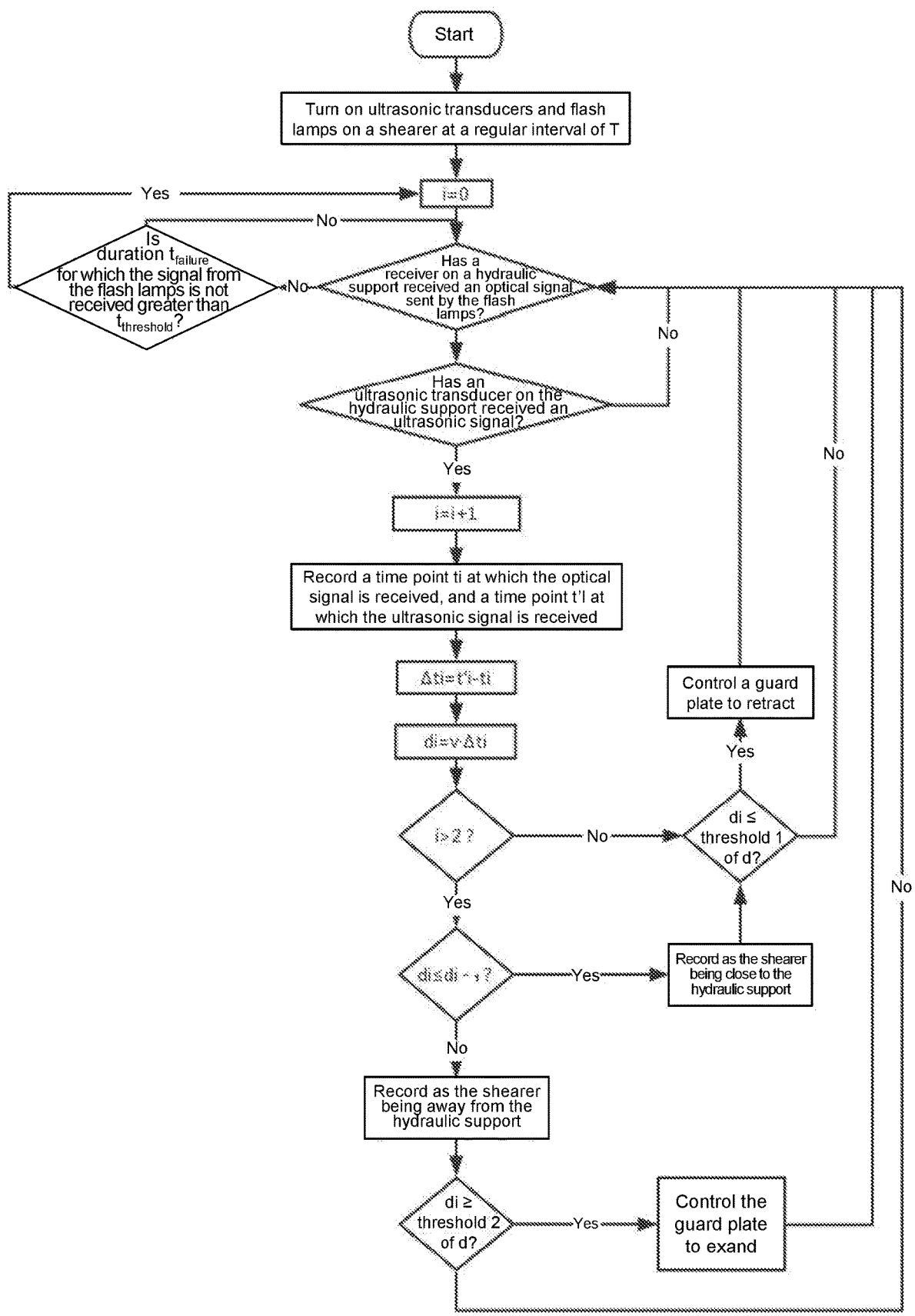
FIG. 4 is a flow chart of control over a guard plate of the hydraulic support.

As shown in FIG. 4, an interference protection method for a hydraulic support and a cutting part of a shearer specifically includes the following steps:

(1) A threshold d of a minimum distance from a second ultrasonic transducer on the hydraulic support to first ultrasonic transducers on the shearer when the shearer gets close to the hydraulic support is set to a threshold 1, and a threshold d of a minimum distance from the second ultrasonic transducer on the hydraulic support to the first ultrasonic transducers on the shearer when the shearer moves away from the hydraulic support is set to a threshold 2. A time threshold is also set as $t_{threshold}$.

(2) An external single-chip microcomputer is used to control the first ultrasonic transducers and flash lamps on the shearer to simultaneously run and turn off, where the first ultrasonic transducers and the flash lamps are turned on at a regular interval of $T=1$ s.

(3) i is let to be 0 (i is recorded in order to compare numerical values of di and di−1 later).

(4) Step (5) is performed if a receiver on the hydraulic support receives an optical signal sent by the flash lamps; otherwise, step (6) is performed.

(5) Steps (7) to (11) are performed if the second ultrasonic transducer on the hydraulic support receives an ultrasonic signal sent by the first ultrasonic transducers on the shearer; otherwise, step (4) is performed.

(6) Duration for which the receiver on the hydraulic support fails to receive the optical signal sent by the flash lamps is recorded as $t_{failure}$. If $t_{failure}$ is greater than $t_{threshold}$, step (3) is performed; otherwise, step (4) is performed.

(7) i is let to be i+1.

(8) A time point ti at which the receiver receives the optical signal, and a time point t'i at which the second ultrasonic transducer on the hydraulic support receives the ultrasonic signal are recorded.

(9) A difference between the time points at which the second ultrasonic transducer and the receiver on the hydraulic support respectively receive the ultrasonic signal and the optical signal is calculated: $\Delta ti = t'i - ti$.

(10) A distance di from the second ultrasonic transducer on the hydraulic support to the first ultrasonic transducer on the shearer is calculated: $di = v \cdot \Delta ti$, where v is the velocity of sound herein because the velocity of light is much greater than the velocity of sound.

(11) If i>2, step (12) is performed; otherwise, step (13) is performed.

(12) If di≤di−1, step (13) is performed; otherwise, step (15) is performed.

(13) A current status is recorded as a status of the shearer being close to the hydraulic support, and the calculated distance di from the second ultrasonic transducer on the hydraulic support to the first ultrasonic transducer on the shearer is compared with the set threshold 1 of d. If di is less than the set threshold 1 of d, step (14) is performed; otherwise, step (4) is performed.

(14) A hydraulic support control computer sends out a signal to control a guard plate to retract, and step (4) is performed.

(15) A current status is recorded as a status of the shearer being away from the hydraulic support, and the calculated distance di from the second ultrasonic transducer on the hydraulic support to the first ultrasonic transducer on the shearer is compared with the set threshold 2 of d. If di is greater than the set threshold 2 of d, step (16) is performed; otherwise, step (4) is performed.

(16) The hydraulic support control computer sends out a signal to control the guard plate to extend, and step (4) is performed.

During operation, the ultrasonic transducers and the flash lamps on the shearer are controlled by an externally connected single-chip microcomputer to ensure their simultaneous running and turning off. The ultrasonic transducer and the receiver on the hydraulic support maintain a running status all the time. A distance from the shearer to the hydraulic support is obtained by calculation from a difference between time points at which the ultrasonic transducer and the receiver on the hydraulic support respectively receive the ultrasonic signal and the optical signal, and thus a guard plate of the hydraulic support is timely controlled to retract so as to prevent interference between the hydraulic support and a cutting part of the shearer.

The present invention has the following advantages: The device of the present invention obtains a distance from the shearer to the hydraulic support by calculation from a difference between time points at which the ultrasonic transducer and the receiver on the hydraulic support respectively receive the ultrasonic signal and the optical signal, and thus timely controls a guard plate of the hydraulic support to retract so as to prevent interference between the hydraulic support and a cutting part of the shearer. The device further uses dust-proof cases and a dust-proof housing to protect components and parts against dust, preventing coal ash and dust from entering the inside and thus prolonging service life of the components and parts. The device of the present invention has low cost, high applicability, and high reliability, and is safe and accurate during use.

Apparently, those skilled in the art can make various modifications and variations to the present invention without departing from the spirit and scope of the present invention. Thus, if such modifications and variations to the present invention fall within the scope of the appended claims and equivalents, the present invention is also intended to include these modifications and variations.

What is claimed is:

1. An interference protection method for a hydraulic support and a cutting part of a shearer comprising the following steps:

step (1) setting a threshold d of a minimum distance from a second ultrasonic transducer on the hydraulic support to first ultrasonic transducers on the shearer when the shearer gets close to the hydraulic support to a threshold 1, and setting a threshold d of a minimum distance from the second ultrasonic transducer on the hydraulic support to the first ultrasonic transducers on the shearer when the shearer moves away from the hydraulic support to a threshold 2; and also setting a time threshold as $t_{threshold}$;

step (2) using an external single-chip microcomputer to control the first ultrasonic transducers and flash lamps on the shearer to simultaneously run and turn off, wherein the first ultrasonic transducers and the flash lamps are turned on at a regular interval of T=1 s;

step (3) letting i be 0;

step (4) performing the step (5) if a receiver on the hydraulic support receives an optical signal sent by the flash lamps; otherwise, performing the step (6);

step (5) performing steps (7) to (11) if the second ultrasonic transducer on the hydraulic support receives an ultrasonic signal sent by the first ultrasonic transducers on the shearer; otherwise, performing the step (4);

step (6) recording duration for which the receiver on the hydraulic support fails to receive the optical signal sent by the flash lamps as $t_{failure}$; and if $t_{failure}$ is greater than $t_{threshold}$, performing the step (3); otherwise performing the step (4);

step (7) letting i be i+1;

step (8) recording a time point ti at which the receiver receives the optical signal, and a time point t'i at which the second ultrasonic transducer on the hydraulic support receives the ultrasonic signal;

step (9) calculating a difference between the time points at which the second ultrasonic transducer and the receiver on the hydraulic support respectively receive the ultrasonic signal and the optical signal: $\Delta ti = t' - ti$;

step (10) calculating a distance from the second ultrasonic transducer on the hydraulic support to the first ultrasonic transducer on the shearer: $di = v \cdot \Delta ti$, wherein v is a velocity of sound;

step (11) if i>2, performing the step (12); otherwise, performing the step (13);

step (12) if di≤di−1, performing the step (13); otherwise, performing the step (15);

step (13) recording a current status as a status of the shearer being close to the hydraulic support, and comparing the calculated distance di from the second ultrasonic transducer on the hydraulic support to the first ultrasonic transducer on the shearer with the set threshold 1 of d; and if di is less than the set threshold 1 of d, performing the step (14); otherwise, performing the step (4);

step (14) sending out, by a hydraulic support control computer, a signal to control a guard plate to retract, and performing the step (4);

step (15) recording a current status as a status of the shearer being away from the hydraulic support, and comparing the calculated distance di from the second ultrasonic transducer on the hydraulic support to the first ultrasonic transducer on the shearer with the set threshold 2 of d; and if di is greater than the set threshold 2 of d, performing the step (16); otherwise, performing the step (4); and step (16) sending out, by the hydraulic support control computer, a signal to control the guard plate to extend, and performing the step (4).

* * * * *